(12) United States Patent
Blom-Schieber

(10) Patent No.: US 10,449,754 B2
(45) Date of Patent: Oct. 22, 2019

(54) WRINKLE REDUCTION IN FORMED COMPOSITE LAMINATES

(71) Applicant: The Boeing Company, Chicago, IL (US)

(72) Inventor: Adriana Willempje Blom-Schieber, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 290 days.

(21) Appl. No.: 15/194,986

(22) Filed: Jun. 28, 2016

(65) Prior Publication Data
US 2017/0368815 A1    Dec. 28, 2017

(51) Int. Cl.
| | | |
|---|---|---|
| *B32B 41/00* | (2006.01) | |
| *B32B 38/18* | (2006.01) | |
| *B32B 7/03* | (2019.01) | |
| *B32B 5/26* | (2006.01) | |

(52) U.S. Cl.
CPC ............ *B32B 38/1866* (2013.01); *B32B 5/26* (2013.01); *B32B 7/03* (2019.01); *B32B 2305/08* (2013.01); *B32B 2307/514* (2013.01)

(58) Field of Classification Search
CPC ....... B32B 38/1866; B32B 5/26; B32B 7/005; B32B 2307/514; B32B 2305/08; B29C 70/207; B29C 70/34; B29D 99/0003; B29L 2031/001; G06F 2217/44

USPC .......................... 156/64, 350, 351, 378, 379
See application file for complete search history.

(56) References Cited

U.S. PATENT DOCUMENTS

| | | | |
|---|---|---|---|
| 5,064,439 A | * | 11/1991 | Chang ................. A61F 2/30965 |
| | | | 264/255 |
| 7,243,055 B2 | | 7/2007 | Chen et al. |
| 7,943,076 B1 | | 5/2011 | Hawkins et al. |
| 8,306,789 B2 | | 11/2012 | Krog |
| 8,720,825 B2 | | 5/2014 | Kismarton |
| 8,795,567 B2 | | 8/2014 | Bland |
| 9,102,102 B2 | | 8/2015 | Meyer et al. |
| 9,242,393 B2 | | 1/2016 | Bland |
| 9,278,484 B2 | | 3/2016 | Guzman et al. |
| 9,289,949 B2 | | 3/2016 | Kismarton |
| 2010/0121625 A1 | | 5/2010 | Krog |
| 2012/0076989 A1 | * | 3/2012 | Bland ................... B29C 70/205 |
| | | | 428/174 |
| 2013/0330503 A1 | | 12/2013 | Kismarton |
| 2016/0009368 A1 | | 1/2016 | Kismarton |

OTHER PUBLICATIONS

Extended European Search Report, dated Oct. 23, 2017, regarding Application No. 17163124.5, 7 pages.

* cited by examiner

*Primary Examiner* — Michael N Orlando
*Assistant Examiner* — Joshel Rivera
(74) *Attorney, Agent, or Firm* — Yee & Associates, P.C.

(57) ABSTRACT

Wrinkling of a contoured composite laminate part during forming to contour is reduced by using laminate plies having off-angle reinforcing fibers that provide the part with primary axial strength along a major axis of loading.

37 Claims, 12 Drawing Sheets

| PLY | ANGLES |
|---|---|
| 1 | 45 |
| 2 | 90 |
| 3 | -45 |
| 4 | 0 |
| 5 | 45 |
| 6 | 0 |
| 7 | 0 |
| 8 | -45 |
| 9 | 0 |
| 10 | 0 |
| 11 | 45 |
| 12 | -45 |
| 13 | 0 |
| 14 | 0 |
| 15 | -45 |
| 16 | 45 |
| 17 | 0 |
| 18 | 0 |
| 19 | -45 |
| 20 | 0 |
| 21 | 0 |
| 22 | 45 |
| 23 | 0 |
| 24 | -45 |
| 25 | 90 |
| 26 | 45 |

FIG. 11A

| PLY | ANGLES |
|---|---|
| 1 | 64 |
| 2 | -20 |
| 3 | -64 |
| 4 | 29 |
| 5 | 20 |
| 6 | 20 |
| 7 | 90 |
| 8 | -29 |
| 9 | -20 |
| 10 | 20 |
| 11 | 20 |
| 12 | -20 |
| 13 | -20 |
| 14 | -20 |
| 15 | -20 |
| 16 | 20 |
| 17 | 20 |
| 18 | -20 |
| 19 | -29 |
| 20 | 90 |
| 21 | 20 |
| 22 | 20 |
| 23 | 29 |
| 24 | -64 |
| 25 | -20 |
| 26 | 64 |

| | ZONE 1 | ZONE 2 | ZONE 3 | ZONE 4 | ZONE 5 | ZONE 6 | ZONE 7 | ZONE 8 | ZONE 9 | ZONE 10 |
|---|---|---|---|---|---|---|---|---|---|---|
| SEQUENCE 1 | 90 | 90 | 90 | 90 | 90 | 90 | 90 | 90 | 90 | 90 |
| SEQUENCE 2 | | 54 | 54 | | | | | | 54 | 54 |
| SEQUENCE 3 | 20 | 20 | 20 | 20 | 20 | 20 | | | | |
| SEQUENCE 4 | | -54 | -54 | | | | | | -54 | -54 |
| SEQUENCE 5 | -20 | -20 | -20 | -20 | -20 | -20 | | | | |
| SEQUENCE 6 | 54 | 54 | 54 | 54 | 54 | 54 | 54 | | | |
| SEQUENCE 7 | -20 | | | | | -20 | -20 | -20 | -20 | -20 |
| SEQUENCE 8 | -54 | -54 | | | | | -54 | -54 | -54 | |
| SEQUENCE 9 | 20 | 54 | -54 | -54 | -54 | | | | | |
| SEQUENCE 10 | 54 | 54 | 54 | 54 | | 20 | 54 | 54 | 54 | |
| SEQUENCE 11 | -54 | -54 | 20 | 20 | -54 | -54 | | | | |
| SEQUENCE 12 | 54 | 54 | -54 | -54 | 20 | | | | | |
| SEQUENCE 13 | 20 | 20 | -20 | -20 | -20 | 20 | 20 | 20 | 20 | |
| SEQUENCE 14 | -54 | -54 | -54 | -54 | -54 | -20 | | | | |
| SEQUENCE 15 | -20 | -20 | -20 | -20 | -54 | -54 | -54 | -54 | | |
| SEQUENCE 16 | -54 | -54 | -54 | | | | | | -54 | -54 |
| SEQUENCE 17 | 90 | | 90 | 90 | 90 | 90 | | | | |
| SEQUENCE 18 | 54 | 54 | 54 | 54 | 54 | 54 | 54 | 54 | 54 | 54 |

WRINKLE REDUCTION IN FORMED COMPOSITE LAMINATES

BACKGROUND INFORMATION

1. Field

The present disclosure generally relates to fabrication of contoured composite laminates, especially those having high aspect ratios, and deals more particularly with a method of reducing wrinkling of a laminate during forming to a desired contour.

2. Background

In one process for producing elongated composite laminate parts having contoured geometries, unidirectional prepreg plies are laid up, either by hand or using automated layup equipment, to form a flat laminate stack. In an initial forming operation, a pair of matched dies punch form the flat stack into a straight part having a desired cross-sectional shape. In a secondary forming operation, the part is formed onto a contoured forming tool which imparts a desired contour to the part along its length. As a result of these two forming operations, the part has contours along two axes.

Traditional laminate layups typically use a combination of 0°, 45° and 90° plies. When using these traditional laminates in the process described above to produce contoured composite laminate parts having high aspect ratios, such as stringers and spars used in aerospace vehicles, ply wrinkling may occur because some of the reinforcing fibers in the plies having 0° orientations. The fibers in the 0° plies strain in response to being loaded in compression along the entire length of the part during the secondary forming operation. The problem of ply wrinkling can be more pronounced where the part has a large number of plies and/or contains joggles or aggressive ply ramps along its length. Ply wrinkling is undesirable. In some applications, parts can be reworked to reduce or eliminate ply wrinkling, however the rework adds to labor costs and may reduce production rate. One solution to the wrinkling problem involves cutting the 0° plies into segments however this may decrease load carrying ability. The reduced load carrying ability can be compensated by adding additional plies to the part, however this approach to the problem increases material costs and part weight.

SUMMARY

The disclosure relates in general to fabrication of composite laminate parts having contoured geometries and high aspect ratios, and more specifically to a fabrication method that reduces ply wrinkling during forming of the laminate to a desired contour.

According to one aspect, a method is provided of making a composite laminate part exhibiting reduced wrinkling which has a desired contour along a major axis of loading. The method includes laying up a substantially flat stack of fiber plies, each having a unidirectional fiber orientation. At least some of the plies provide the part with primary axial stiffness along the major axis of loading. The method includes orienting the plies at off-angles relative to the major axis of loading to reduce the compressive force acting on the fibers during forming. The method also includes forming the stack to a desired cross-sectional shape and forming the stack desired contour. During forming, strain on the plies providing the primary axial stiffness is reduced as a result of their off-angle orientation.

According to another aspect, a method is provided of making a contoured composite laminate part having a high aspect ratio, a major axis of loading, and a plurality of zones along its length respectively having desired stiffnesses. The method includes selecting a set of fiber angles for plies of unidirectional reinforcing fibers, and determining, for each of the fiber angles, the number of plies in each of the zones required to provide a desired set of in-plane laminate properties in the zone. The method also includes determining the shape and a stacking sequence of the plies. The method further includes laying up plies into a flat stack using the stacking sequence, and forming the flat stack into the shape of the contoured composite laminate part.

According to still another aspect, a method is provided of making a composite laminate stiffener having a major axis of loading, and contoured both longitudinally and transversely. The method includes laying up a substantially flat stack of fiber plies each having a unidirectional fiber orientation wherein at least some of the plies provide the part with primary axial stiffness along a major axis of loading. Laying up the plies includes orienting the plies providing the primary axial stiffness at off-angles relative to the major axis of loading. The method also includes forming the stack to desired transverse and longitudinal contours, wherein during the forming, the fibers in the plies providing the stiffener with primary axial stiffness transition along their lengths to from compressive state to a neutral state and from the neutral state to a tensile state. During the forming, strain on the plies providing the primary axial stiffness is reduced due to their off-angle orientation.

According to still another aspect, a method is provided of forming a composite laminate stiffener having a primary axis of loading. The method comprises laying up a flat composite laminate stack of plies of reinforcing fibers, and forming composite laminate stack such that at least some of the plies are subjected to compression loading. The method also includes shortening the length over which the fibers are compressed on the plies that are subjected to compression during forming.

According to another aspect, a method is provided of forming a composite laminate stiffener contoured along a primary axis of loading. The method includes laying up a flat stack of plies of reinforcing fibers, wherein some of the plies provide the stiffener with primary axial stiffness, and forming the flat stack to a desired contour along the primary axis of loading, wherein the forming places the fibers in the plies providing primary axial stiffness in compression and causes stretching of the fibers. The method also includes reducing the compression of the fibers in the plies providing primary axial stiffness by reducing the length over which the fibers are compressed during the forming. The method also includes converting a portion of the stretching into shear deformation.

According to a further aspect, a composite laminate stiffener is provided that is contoured along a major axis of loading. The stiffener includes a plurality of laminated plies of unidirectional reinforcing fibers held in a plastic matrix, wherein all of the plies have fiber orientations at off-angles relative to the major axis of loading.

One of the advantages of the fabrication method is the elimination of plies having 0° fiber orientations which have a tendency to wrinkle when formed to a contoured geometry.

Another advantage of the fabrication method is that the plies having fiber orientations primarily intended to provide strength and stiffness along the longitudinal axis of the part are shorter in length, compared to 0° fibers which extend entire length of the laminate, and permit increased axial strain before being subject to buckling. The reduction in the length of these fibers reduces the amount of friction between the plies, allowing transverse slip to take place between them, which in turn reduces the compression of those fibers having the highest tendency to buckle.

A further advantage of the fabrication method is that composite laminate parts with having contoured geometries and high aspect ratios can be produced in which the plies having fiber orientations providing strength and stiffness along the longitudinal axis of the part are oriented such that they transition from a compressive state to a neutral and then a tensile state during forming, permitting these plies to relax rather than buckle.

Still another advantage of the embodiments is that a highly contoured composite laminate part, such as a contoured stiffener, can be produced that provides adequate stiffness along a major axis of loading without the need for plies having a 0° orientation and without increasing the weight of the part.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 9 is an illustration showing exaggerated buckling of the off-angle fiber and slippage between the plies.

FIG. 11A and FIG. 11B are illustrations of comparative tables showing ply stacking sequences that result in substantially equivalent in-plane stiffness properties, respectively for two laminate parts.

FIG. 15 is an illustration of a table showing the layup sequence for the ply stack shown in FIG. 15.

DETAILED DESCRIPTION

Figure 1:
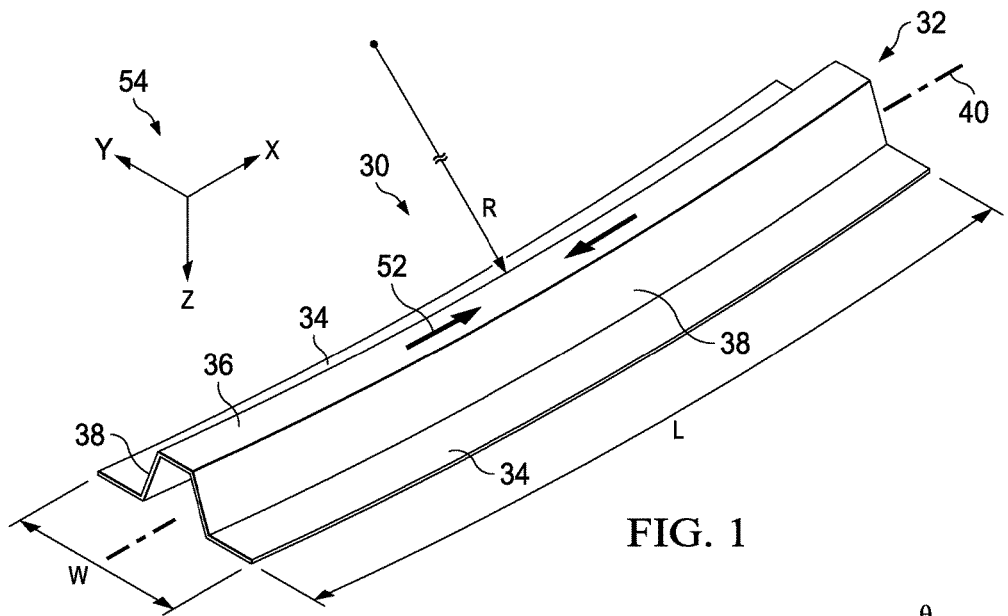
FIG. 1 is an illustration of a perspective view of a contoured composite laminate stiffener.

Referring first to FIG. 1, a composite laminate part 30 is contoured along its length L and has a radius of curvature R. In the illustrated example, the part 30 is a stringer 30, also referred to herein as a stiffener 30, used to transmit loads in a structure such as the airframe of an aircraft, however principles of the disclosed embodiments may be used in the fabrication of a wide range of other types of contoured composite parts, especially structural stiffeners, having various cross sectional shapes. As used herein "contour" and "contoured" are each used in its broadest sense, and includes but is not limited to curvatures in any portion, or throughout the length of the part 30. "Contour" and "contoured" also include curvatures or other geometric features having either a constant or a changing radius of curvature, as well as local changes in geometry such as, without limitation, joggles. The stiffener 30 has a hat section 32 defined by a cap 36 and a pair of webs 38. The webs 38 connect the cap 36 with a pair of flanges 34 that extend outwardly. The stiffener 30 has a length L that is significantly greater than its width W, and thus has a high aspect ratio.

The stiffener 30 has a major axis of loading 40, which in the illustrated example, is aligned with the X axis in the coordinate system shown at 54. The stiffener 30 thus possesses double contour. The first contour is along the length of the stiffener 30 in the XZ plane, and the second contour defined by the hat section 32 is in the YZ plane. While a hat stringer 30 is illustrated, principles of the disclosed embodiments are also applicable to other types of stiffeners, including but not limited to stiffeners having other cross-sectional shapes such as a Z-shape, a C-shape, a rounded hat shape, or a blade (an I-shape), etc. Principles of the disclosed embodiments are likewise applicable to other types of composite laminate structural members such as spars and floor beams that are contoured in one or more planes and/or have cross-sectional shapes that vary along the length of the member.

Figure 2:
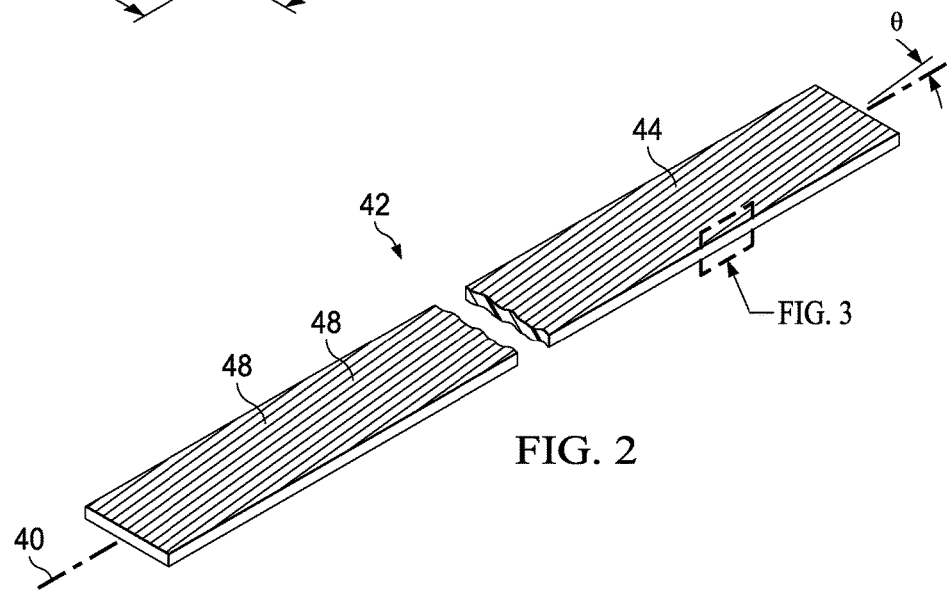
FIG. 2 is an illustration of a perspective view of a flat stack of composite plies used to form the stiffener shown in FIG. 1.
Figure 3:
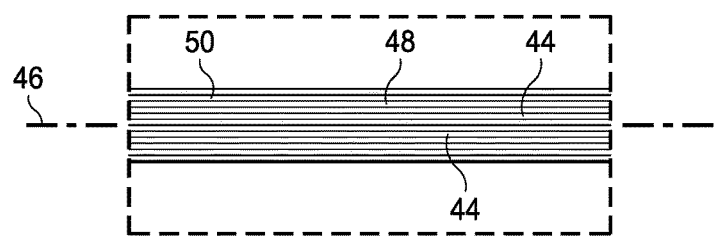
FIG. 3 is an illustration of the area designated as "FIG. 3" in FIG. 2.

Referring now to FIGS. 2 and 3, the stiffener 30 shown in FIG. 1 is fabricated by forming a flat stack 42 of composite plies 44 into a desired cross sectional shape and longitudinal contour. The plies 44 each comprising unidirectional fibers 48 held in a suitable plastic matrix 50. The fibers 48 may be any material suitable for the application including, but not limited to carbon, glass, aramids, ceramic or any combination thereof. The plastic matrix 50 may be a thermoset or a thermoplastic, or a hybrid material system that includes both a thermoset and a thermoplastic. In the illustrated example, prepreg plies are laid up to form the stack 42, however principles of the embodiments are also applicable to the layup of a stack of dry fibers which are subsequently infused with the plastic matrix 50.

The ply 44 shown in FIG. 2 is a full, continuous ply, however the flat stack 42 may include partial, or discontinuous plies (not shown). The fibers 48 in each of the plies 44 are oriented at various angles θ relative to the major axis of loading 40, as will be discussed later in more detail. In the illustrated example, the plies 44 comprising the flat stack 42 are balanced. In a stack 42 with balanced pairs of fiber angles, the plies 44 are arranged in pairs of equal positive and negative angular orientations. In other examples, however the plies 44 may be unbalanced. Further, the flat stack 42 may be symmetric or unsymmetric. In a symmetric stack 42, the sequence of the plies on either side of a mid-plane 46 of the stack 42 are mirror images of each other. As will be discussed below, all of the plies 44 are oriented at off-angles θ relative to the major axis of loading 40, thus, none of the fibers 48 have 0° fiber orientations.

Figure 4:
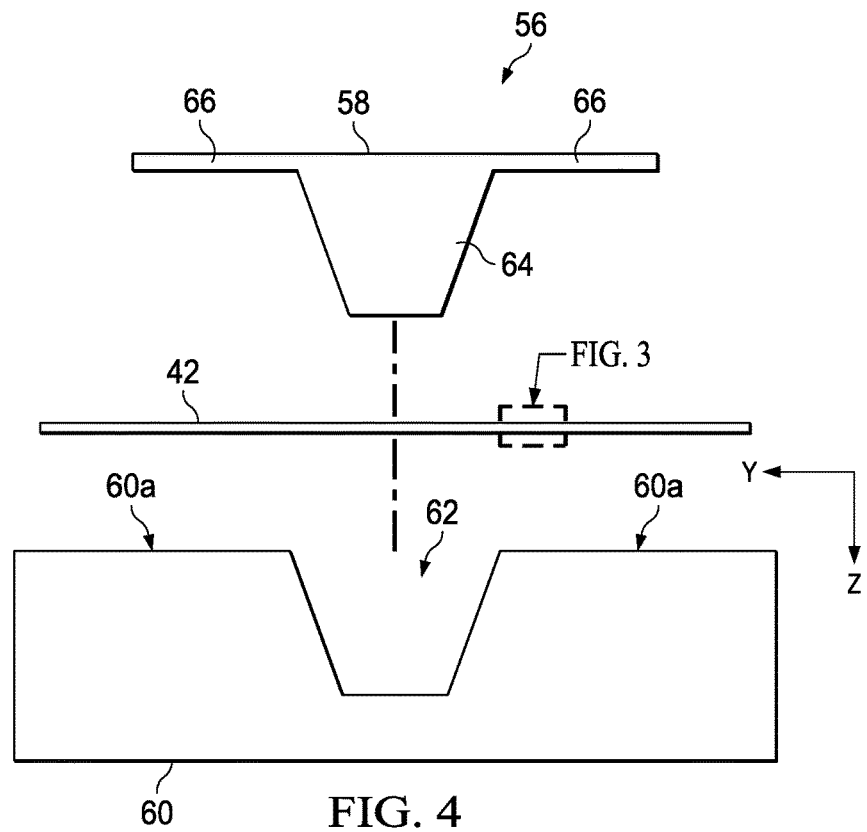
FIG. 4 is an illustration of an exploded end view of a die set used to stamp form the flat stack of FIG. 2 into a straight stiffener with a desired cross-sectional shape.
Figure 5:
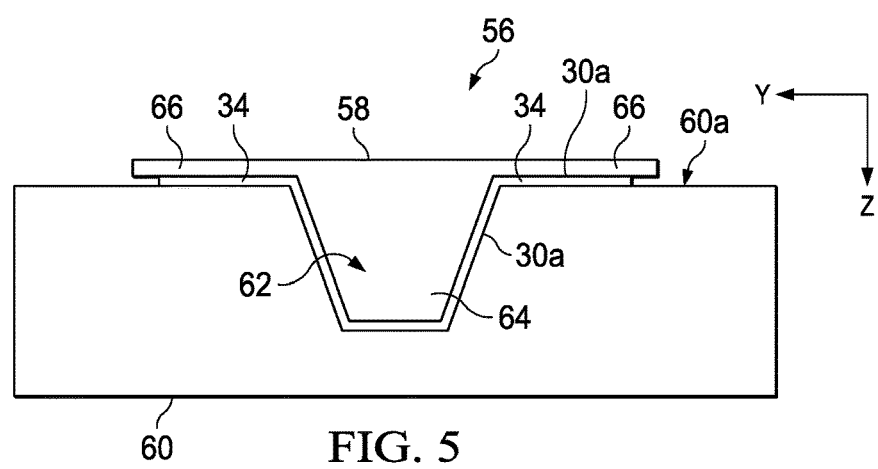
FIG. 5 is an illustration similar to FIG. 4 but showing the flat stack having been stamped formed to the desired cross-sectional shape.

Attention is now directed to FIGS. 4 and 5 which illustrate a die set 56 used to stamp form the flat stack 42 into a straight stiffener 30a having a desired cross-sectional shape, which in the illustrated example is a hat shape. The die set 56 comprises matching male and female dies 58, 60 respectively, that are placed in a press (not shown) or other machine which forces the dies 58, 60 together. The male die 58 includes a punch 64 and a pair of die flanges 66. The female die 60 includes a die cavity 62 having a cross sectional shape that matches that of the punch 64. In preparation for forming operation, the flat stack 42 is placed on upper surfaces 60a of the female die 60. Then, as shown in FIG. 5, the die set 56 is closed causing the punch 64 to force a portion of the flat stack 42 into the die cavity 62, while the die flanges 66 compress other portions of the stack 42 against the upper surfaces 60a of the female die 60.

Figure 6:
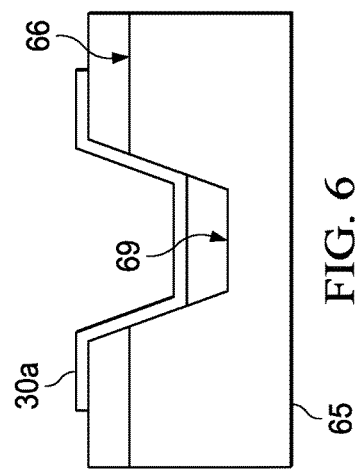
FIG. 6 is an illustration of an end view of a cure tool on which the stamped formed stiffener has been placed in preparation for forming it to a desired contour.
Figure 7:
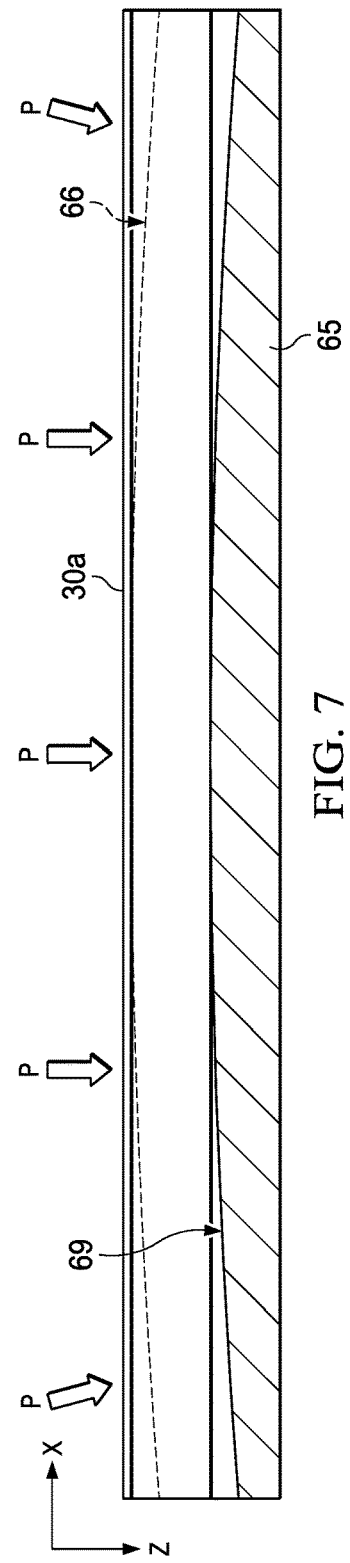
FIG. 7 is an illustration of a side view of the cure tool shown in FIG. 6, better illustrating the contoured tool surfaces onto which the straight stiffener are formed to the desired contour.

FIGS. 6 and 7 illustrate a cure tool 65 that is used to form the straight stiffener 30a to a desired contour along its length, and maintain the shape of the fully formed stiffener 30 during curing. The cure tool 65 is provided with contoured tool surfaces 69 that match the shape of the contoured stiffener 30 shown in FIG. 1. In preparation for contour forming, the straight stiffener 30a is placed on the cure tool 65, and the assembly of the stiffener 30a and cure tool 65 is then vacuum bagged (not shown) and placed in an autoclave (not shown). The combination of heat and pressure P applied to the stiffener 30a in the autoclave, form it down onto the contoured tool surfaces 69 and cure the stiffener 30.

It should be noted here that while a two-stage process for forming the part 30 has been described in the illustrated embodiment, other processes, including a single stage process may be employed in which all contours, both longitudinal and traverse, are formed of a single forming operation. For example, where the plastic matrix is a thermoplastic, the flat stack can be heated to forming temperature and stamped formed to final shape in a consolidation press. Moreover, while thermal curing may be used where the plastic matrix is a thermoset, other curing methods may be employed, depending upon the particular material system being used, including but not limited to curing the formed thermoset part 30 at room temperature.

Figure 8:
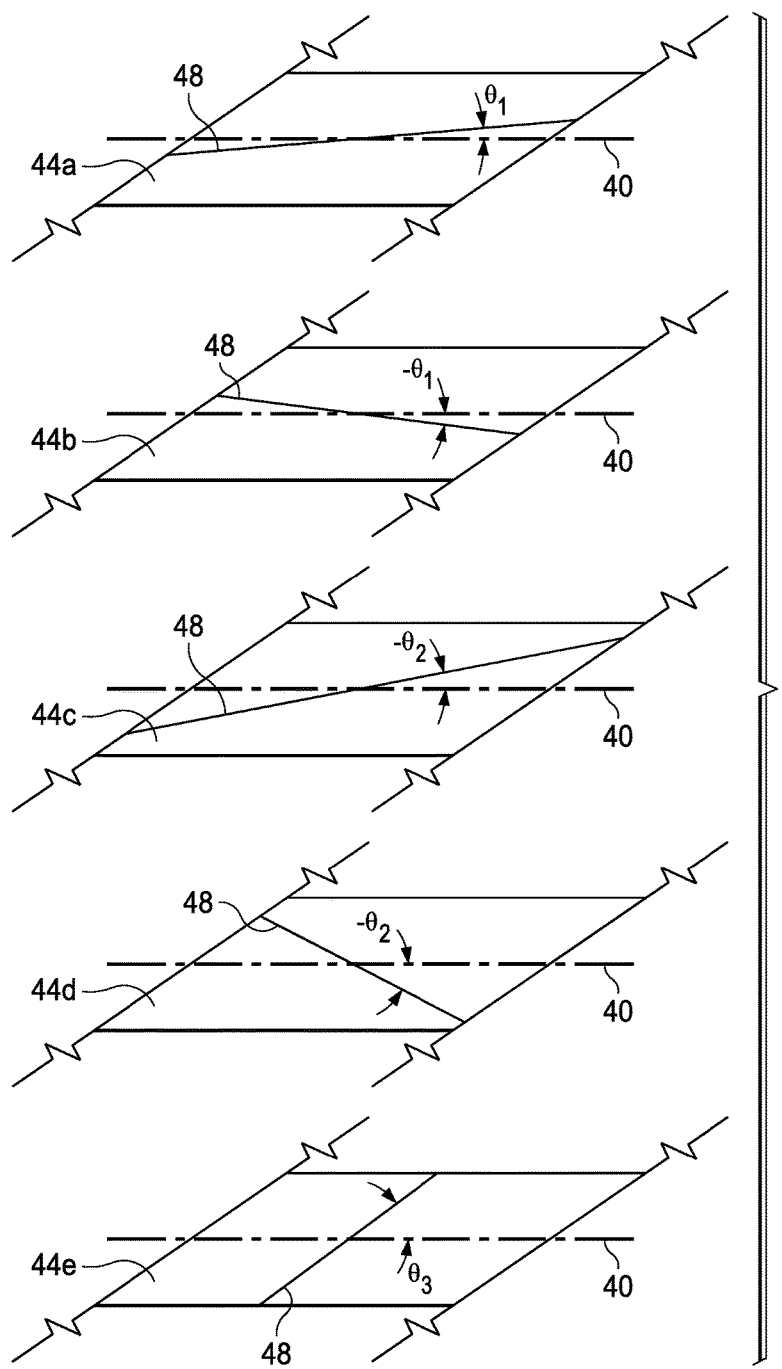
FIG. 8 is an illustration of an exploded view of several of the plies of the stack shown in FIG. 2.

FIG. 8 illustrates several unidirectional plies 44a-44e of the stiffener 30 which comprises a balanced laminate that is devoid of 0° plies. In this example, the plies 44a-44e have fiber angles relative to the major axis of loading 40, of $\pm\theta_1$, $\pm\theta_2$ and $\pm\theta_3$, where $$0<\theta_1<\theta_2\leq\theta_3\leq 90°,$$

$$\theta_2-\theta_1\leq 45°, \text{ and}$$

$$\theta_3-\theta_2\leq 45°.$$

Plies 44a-44e are termed "off-angle" plies because the fibers 48 in these plies form angles with respect to the major axis of loading 40. $+\theta_1$ is within the ranges of approximately $+5°$ up to approximately $+30°$, and $-\theta_1$ is within the ranges of approximately $-5°$ up to approximately $-30°$. The fibers 48 having orientations of $\pm\theta_1$ provide the laminate stiffener 30 with primary axial or longitudinal stiffness, while the fibers 48 having $\pm\theta_2$ fiber orientations provide the laminate with a lesser amount of axial stiffness, and some degree of transverse stiffness. As used herein, "primary axial stiffness" means that the fibers 48 in the ply 44 primarily provide the part 30 with longitudinal or axial stiffness, rather than with traverse stiffness. In the illustrated example, the plies having a 90° orientation ($\theta_3=90°$) provide the stiffener 30 with transverse stiffness.

Figure 9:
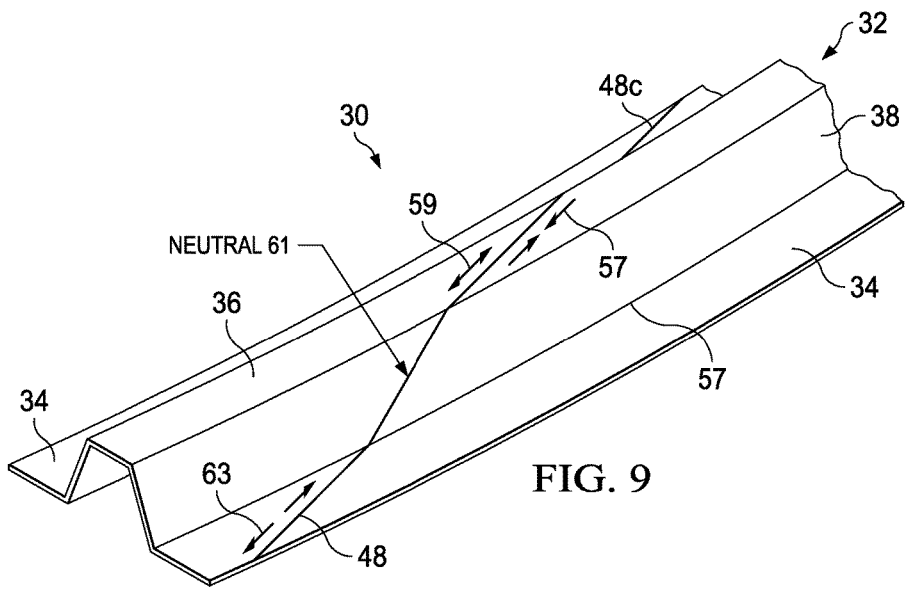
FIG. 9 is an illustration of a fragmentary, perspective view of the stiffener of FIG. 1, showing the orientation of a single fiber of one of the off-angle plies.
Figure 9A:
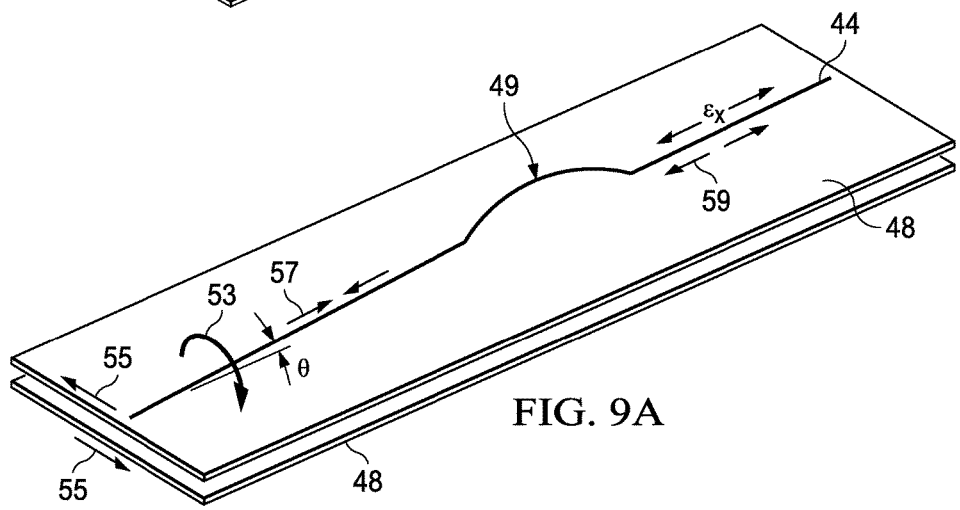
FIG. 9A is an illustration of a perspective view of two adjacent plies of the stiffener of FIG. 9, also showing exaggerated buckling of the off-angle fiber and slippage between the plies.
Figure 10:
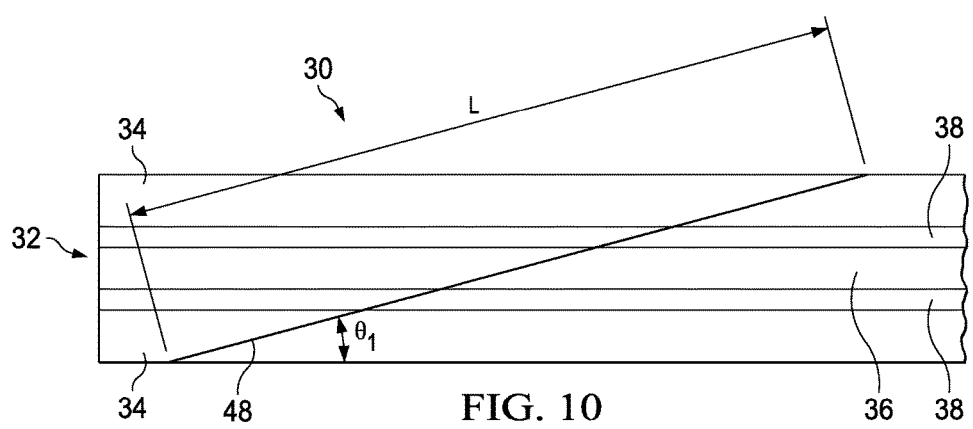
FIG. 10 is an illustration similar to FIG. 10 but showing a plan view of stiffener.

Attention is now directed to FIGS. 9 and 10 which illustrate the off-angle orientation of one of the fibers 48 providing the stiffener 30 with primary axial stiffness. The fiber 48 may form part of the ply 44 shown in FIG. 8 that has an off-angle fiber orientation of $+\theta_1$. As shown in FIG. 10, the fiber 48 has a length L' that is less than the length L (FIG. 1) of the stiffener 30, and is thus shorter in length than fibers in a 0° ply (not shown) of a conventional laminate which would otherwise extend the entire length L of the stiffener 30. Referring now also to FIG. 9A, buckling 49 of the fiber 48 during forming of the straight stiffener 30a to a longitudinal contour is a function of the longitudinal strain $\varepsilon_x$ on the fiber 48, the length L' over which the strain $\varepsilon_x$ is applied and boundary conditions affecting the fiber 48. The tendency of the fiber 48 to buckle 49 can be reduced by reducing the longitudinal strain $\varepsilon_x$ on the fiber 48. Reducing the length L' of the fiber 48, allowing the plies and thus the fiber 48, to slip 55 in plane and placing the fiber 48 in shear 53 due to in-plane twisting during forming, all contribute to reducing the longitudinal strain $\varepsilon_x$ on the fiber 48, and thus the potential for buckling 49.

As will be discussed below, off-angle plies 44 are less likely to wrinkle than 0° plies when the straight stiffener 30a (FIG. 7) is formed to the desired longitudinal contour. The use of off-angle plies 44 reduces ply wrinkling for several reasons. First, off-angle plies 44 reduce the length L over which the individual fibers 48 are compressed 57 (FIGS. 9 and 9A) during forming, and convert a portion of the stretching ($\varepsilon_x$) into shear deformation 53 (FIG. 9A). Second, the off-angle plies 44 are allowed to relax 59 to some degree during forming because the fibers 48 having orientation angles of $\pm 1$ that provide the primary axial stiffness transition from a compressive state 57 at the caps 36 to a neutral state 61 at the webs 38, and then to a tensile state 63 at the flanges 34. This relaxation 59 of a portion of the length L of the fibers 48 reduces their tendency to buckle 49 during the forming process. Third, because the off-angle fibers 48 are shorter in length L (than 0° fibers), some degree of transverse slip 55 between the plies 44 (FIG. 9A) takes place during forming, and this ply slippage resulting in a reduction of the compression 57 of the fibers 48. Fourth, due to the lower loading on the fibers 48 in the off-angle plies 44, the strain $\varepsilon_{fiber}$ on the off-angle fibers 48 is reduced according to $\varepsilon_{fiber}=\varepsilon_x*\cos^2(\theta)$, where $\theta$ is the angular orientation of fiber 48 relative to the major axis of loading 40, and $\varepsilon_x$ is the strain of a ply 44 in the longitudinal direction 40 (FIG. 1).

Using plies 44 with selected combinations of off-angle orientations, and preselected ply sequences, a laminate part 30 may be produced without the need for 0° plies which provides essentially the same stiffness and performance as an equivalent laminate of comparable weight that relies on 0° plies for axial stiffness. Thus, an existing stiffener design uses 0° plies may be redesigned using off-angle plies 44 in order to reduce ply wrinkling without sacrificing laminate stiffness or increasing the weight of the part 30.

Reference is now made to 11A and 11B which respectively show two possible layup sequences 68, 70 for a contoured laminate part, wherein the ply orientation angles 74 are shown for each of the plies 44 in the layup sequence. FIG. 11A shows the sequencing of a 26 ply laminate part using a traditional combination of 0°, ±45° and 90° plies. FIG. 11B shows a redesigned sequencing of the same 26 ply laminate part having the same laminate thickness which avoids the use of 0° plies in order to reduce ply wrinkling during forming. The layup sequence shown in FIG. 11B uses a combination of ±20°, ±29°, ±64° and 90° plies, and results in a contoured laminate part that exhibits stiffness equivalent to the laminate part produced using the ply sequence shown in FIG. 11A, and without increasing part weight.

Figure 12:
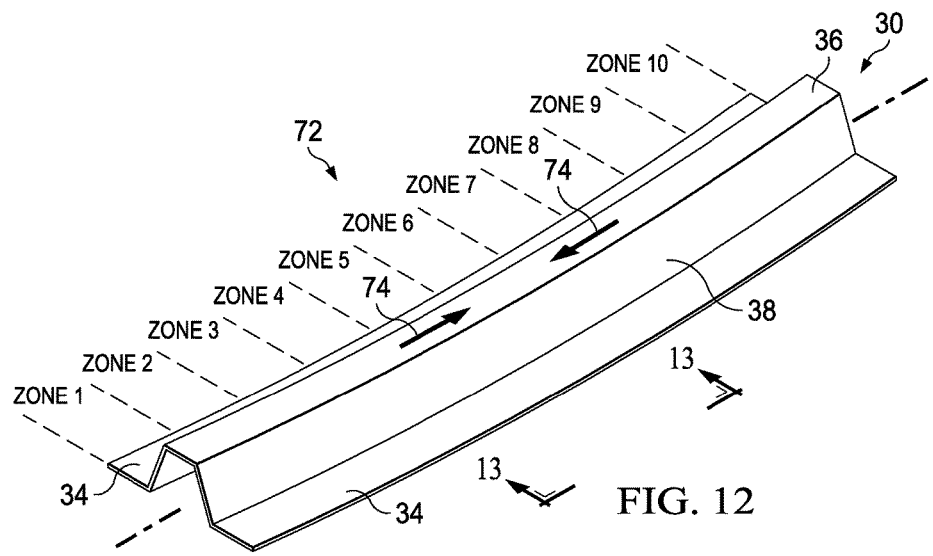
FIG. 12 is an illustration of a perspective view of a contoured composite laminate stiffener having stiffness properties tailored within zones along the length of the stiffener.
Figure 13:
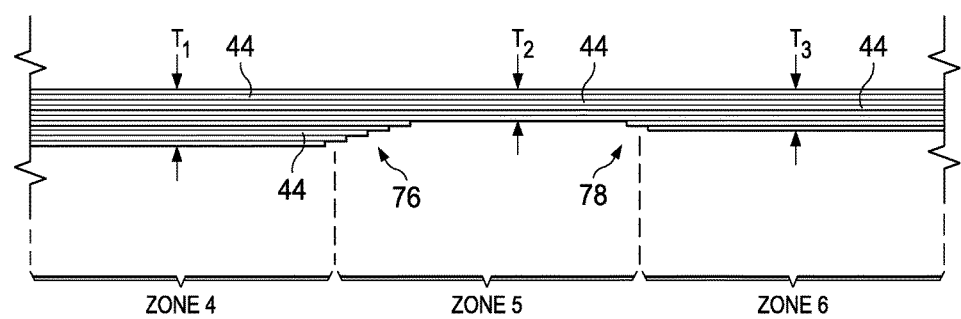
FIG. 13 is an illustration of a side view of one of the flanges of the stiffener shown in FIG. 13, viewed in the direction designated as "FIG. 13" in FIG. 12.

In some applications, a contoured composite laminate part 30 may have different stiffness requirements in different areas of the part. For example, referring now to FIGS. 12 and 13, the contoured composite stiffener 30 may have differing stiffness requirements in different zones 72 along its length. Different stiffness properties in the different zones 72 may be achieved by varying the ply orientations, and/or varying the number of plies of a given orientation in each of the zones 72. For example, referring to FIG. 13, the stiffener 30 may have a thickness $T_3$ in zone 6 that is greater than the thickness $T_2$ in zone 5 but less than the thickness $T_1$ zone 4. Ply ramps 76 are used to transition between zones have differing thicknesses T.

Figure 14:
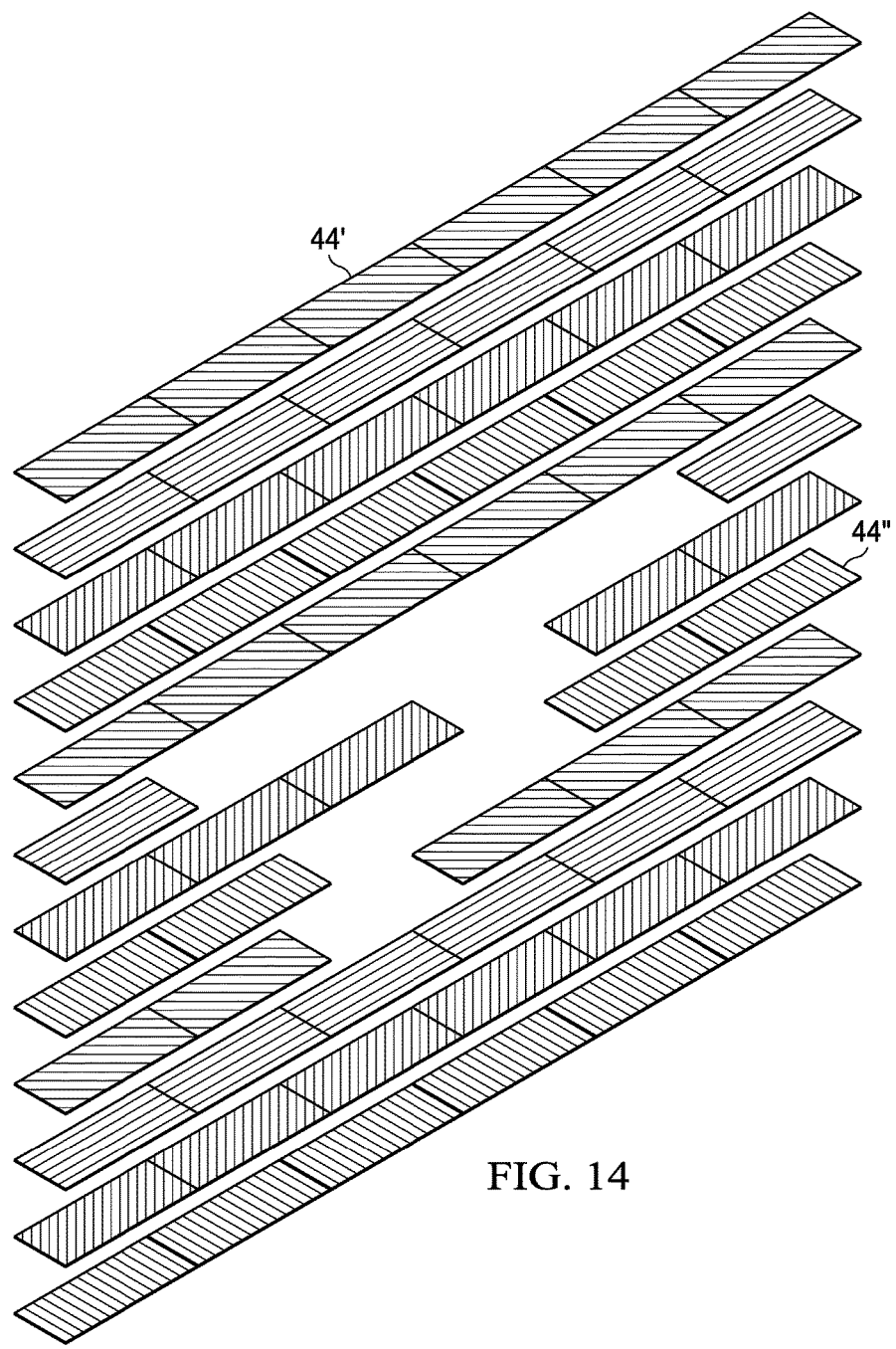
FIG. 14 is an illustration of an exploded, perspective view of a ply stack and stacking sequence that includes partial and full plies.

Referring also now to FIGS. 14 and 15, a laminate part 30 having differing thicknesses along its length to provide individual zones of tailored stiffness properties may be achieved by laying up a combination of full plies 44' and partial plies 44" (FIG. 14) of selected fiber orientations in a predetermined sequence. FIG. 15 illustrates the layup sequence for producing differing stiffnesses in each of zone 1-10. In this example, the laminate part 30 has differing ply thicknesses T (FIG. 13) in various ones of the zones 1-10 based on whether a full ply 44' or partial ply 44" (FIG. 14) stretches ($\varepsilon_x$) over that zone. The laminate part 30 represented by the layup sequence shown in FIGS. 14 and 15 includes a combination of full and partial plies having angular orientations of ±20°, ±54°, and 90° cross plies. In this example, the ±20° off-angle plies provide the primary axial stiffness.

Figure 16:
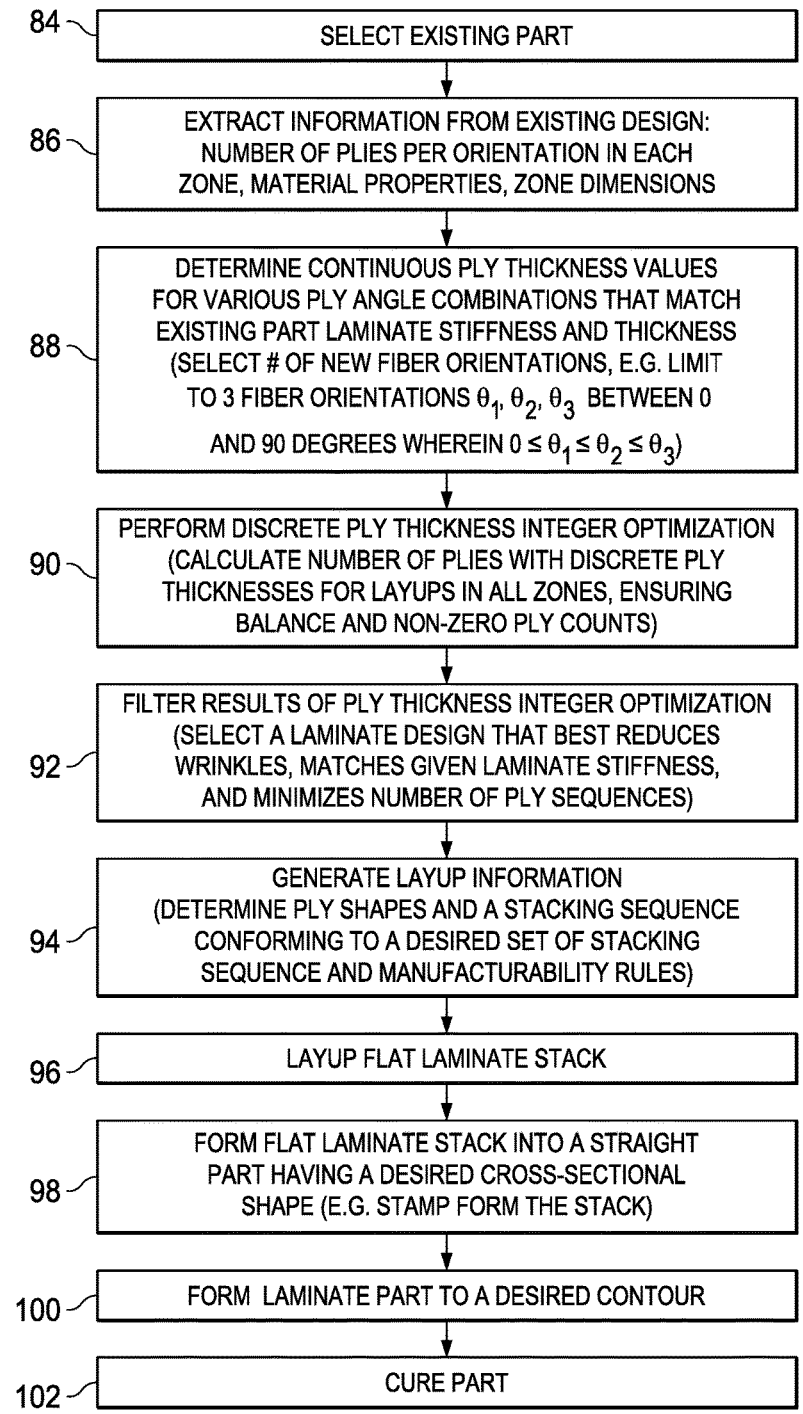
FIG. 16 is an illustration of a flow diagram of a method of making an existing design of a contoured composite laminate part with reduced wrinkling.

FIG. 16 broadly illustrates the overall steps of one method for producing a contoured composite laminate part 30 having reduced wrinkling and exhibiting differing stiffnesses along its length. In this example, the method is used to produce an existing part design that utilizes 0° plies with a new part design that avoids the use of 0° plies. As will be discussed below, the shapes of the plies are selected and optimized only after the ply orientations (fiber angles) and the number of plies per angle are determined for each zone 72 having particular stiffness requirements.

Beginning at 84, an existing part 30 to be replaced is selected which has part specifications that are required to be met including but not limited to differing stiffness properties along its length. At 86, information is extracted from the existing part design such as, without limitation, the number of plies per orientation in each zone, material properties and zone dimensions. At 88, continuous ply thickness values $t_i^j$ are determined for various ply angle combinations that match the existing part laminate stiffness and thickness. The determination made at 88 includes selecting the number of new fiber orientations $\theta$ used for the part 30a, which may include, for example, limiting the laminate to a selected number of fiber orientations, such as three fiber orientations $\theta_1$, $\theta_2$, $\theta_3$, between 90° and 0°, wherein $0<\theta_1<\theta_2\leq\theta_3\leq 90$. Limiting the number of fiber orientations to a relatively small number, such as three fiber orientations $\theta_1$, $\theta_2$, $\theta_3$ allows a full design space to be investigated by iterating over all possible combinations of $\theta_1$, $\theta_2$, $\theta_3$. In practice, fiber orientations are limited to integer numbers between 0 and 90°.

From classical lamination theory (CLT), the stiffness properties of a laminate may be expressed as a function of a set of interrelated stiffness parameters. Assuming a balanced laminate, there are two equations defining the lamination parameters and one equation for the total laminate thickness. Selecting a set of three fiber angles therefore results in the following three equations per layup zone 72, with the three ply thicknesses as unknowns, where the fiber angles are the same for all zones:

$$V_1^j = \frac{1}{N^j t_{ply}} \sum_{i=1}^{3} (t_i^j \cos 2\theta_i)$$

$$V_3^j = \frac{1}{N^j t_{ply}} \sum_{i=1}^{3} (t_i^j \cos 4\theta_i)$$

$$N^j t_{ply} = \sum_{i=1}^{3} t_i^j$$

where $t_i^j$=continuous ply thickness for angle $\theta_i$ in zone j,
$t_{ply}$=actual material ply thickness
$\theta$=fiber angle (ply orientation)
$V^j$=in-plane lamination parameters of the original laminate design in zone j
$N^j$=the total number of plies in zone j The above sets of equations for each zone are independent from the equations for the other zones. Only solutions with positive thickness values for all plies in all of the zones are selected. Only those combinations of three fiber angles that result in the desired laminate properties are selected. At this point in the process, all of these combinations result in the same stiffness, but not all of them can be made, as a practical matter, because the thicknesses typically do not correspond to an integer number. Certain combinations of the fiber angles may be eliminated based on certain composite laminate design rules. For example only fiber angle combinations that meet the following constraints are considered:

$$\theta_2 - \theta_1 \geq 45$$

$$\theta_3 - \theta_2 \geq 45$$

From the above description, it may be appreciated that the process of determining the continuous ply thickness values in step 88 comprises selecting, from multiple possible combinations of fiber angles, a set of fiber angles and determining, for each of the zones, the thickness of the laminate within that zone that will provide the desired stiffness properties.

After a continuous thickness solution is obtained at 88, the continuous solution is reduced to a solution with a discrete value or integer number of plies 44 that, based on the set of fiber angles selected from the possible combinations of angles, provides the desired stiffness within a zone. At step 90, the ply thickness values T are refined by performing discrete ply thickness integer optimization. The discrete ply thickness integer optimization process is a mixed integer optimization problem with an objective of minimizing the difference between the resulting and optimum lamination parameters. The process performed at step 90 comprises calculating the number of plies 44 with discrete ply thicknesses for layups in all of the zones 72, thereby ensuring balance and nonzero ply counts. The completion of steps 88 and 90 results in multiple possible combinations of sets of fiber angles and ply thicknesses that may provide the desired stiffnesses in each zone. These possible combinations are subsequently refined and filtered in order to optimize lamination properties for each of the zones.

Thus, at 92, the results of the ply thickness integer optimization performed at step 90 are filtered. Filtering the results at 92 determines the integer number of plies that will optimize the desired in-plane laminate properties, and results in multiple possible solutions. This filtering the results of step 90, i.e. the optimization process, involves filtering a number of possible optimized solutions based on an allowed deviation of effective laminate properties from a desired set of laminate properties, and results in multiple candidate fiber angle combinations and ply counts for each of the angle in each of the layup zones 1-10 (FIG. 12) of the part 30*a*. This filtering process results in the selection of a laminate design that best reduces wrinkles, matches given laminate stiffness, and minimizes the number of ply sequences.

Steps 88, 90 and 92 result in multiple candidate fiber angle combinations and ply counts for each of these angles for each of the layup zones. At 94, layup information is generated, which may include determining the ply shapes and a stacking sequence that conform to a desired set of stacking sequence and manufacturability rules. Stacking sequence rules avoid undesirable laminate modes. The stacking sequence is chosen, at least in part to achieve substantially homogeneous bending stiffness properties in the laminate. When ply spices are required, naturally created splices are preferred which can be achieved by overlapping the ends of medium length plies. The use of natural splices improves layup efficiency by avoiding the need for short plies required to reinforce splices between long plies, while maintaining structural integrity. Also, in determining the ply shapes, the plies should be continuous wherever possible in order to maximize the transfer loads from one zone to another, as well as to optimize layup efficiency. At 96, the flat stack of plies 44 is laid up based on the layup information generated at 94. Then, at 98, the flat stack 42 is formed, as by stamp forming, into a straight part 30 having a desired cross-sectional shape, such a hat or other shape. At 100, the laminate part 30*a* is then formed to a desired contour along its major axis of loading. Finally, at 102 the fully formed laminate part 30*a* is cured.

Figure 17:
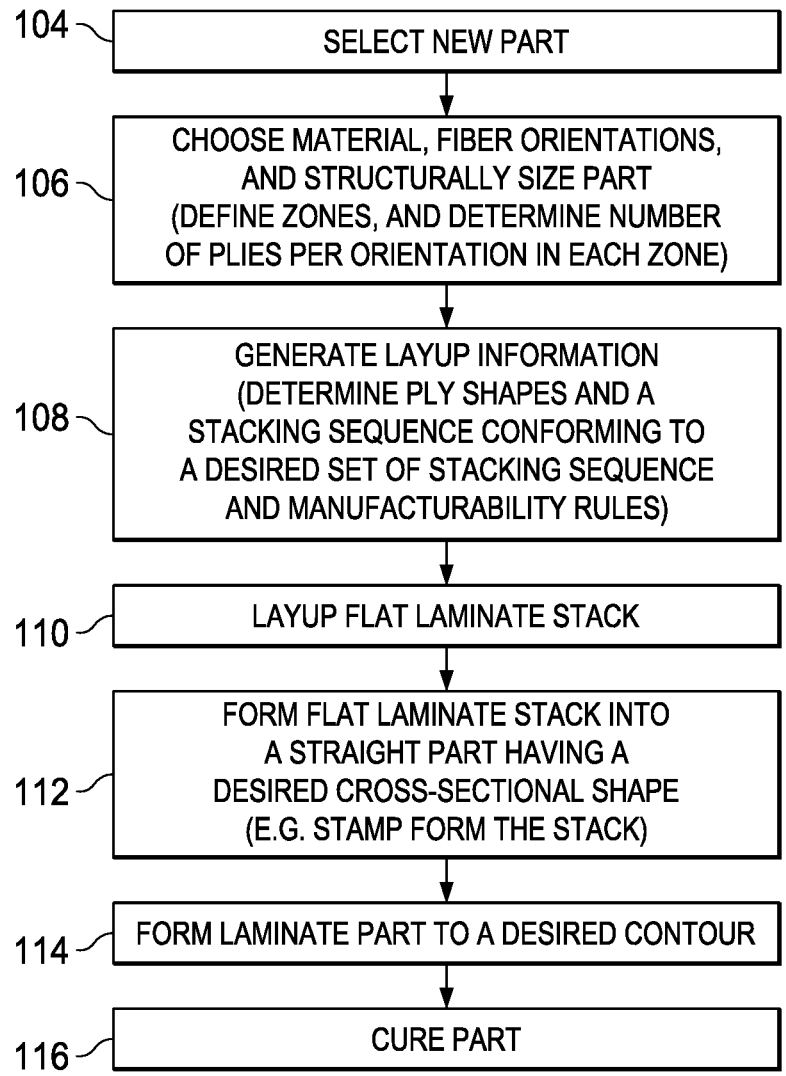
FIG. 17 is an illustration of a flow diagram of a method of making a new design of a contoured composite laminate part with reduced wrinkling.

Attention is now directed to FIG. 17 which broadly illustrates the steps of a method of producing a composite laminate part 30 of a new, rather than an existing design. The process for producing a newly designed laminate part 30 with reduced wrinkling is similar to that previously described with reference to FIG. 16 but without the need for matching the stiffness of an existing part. Briefly, a determination is made of how many plies of each selected ply orientation are required to satisfy specifications for the new part, followed by an optimization of the ply shapes and stacking sequence.

Thus, referring particularly to FIG. 17, a new part is selected at 104, and at 106 the material, fiber orientations and structural size of the part are chosen. In performing step 106, the zones 72 of the part 30 are defined, and the number of plies per orientation in each zone is determined. Next, at 108, layup information is generated, which comprises determining the ply shapes and a stacking sequence that conforms to a desired set of stacking sequence and manufacturability rules. Then, at 110, the flat laminate stack is laid up, following which at 112, the flat laminate stack is formed into a straight part having a desired cross-sectional shape, as by stamp forming or other processes previously described. At 114, laminate part is formed to the desired longitudinal contour and is thereafter cured at 116. As previously mentioned, steps 112 and 114 may be simultaneously performed where the forming is carried out in a single operation.

Figure 18:
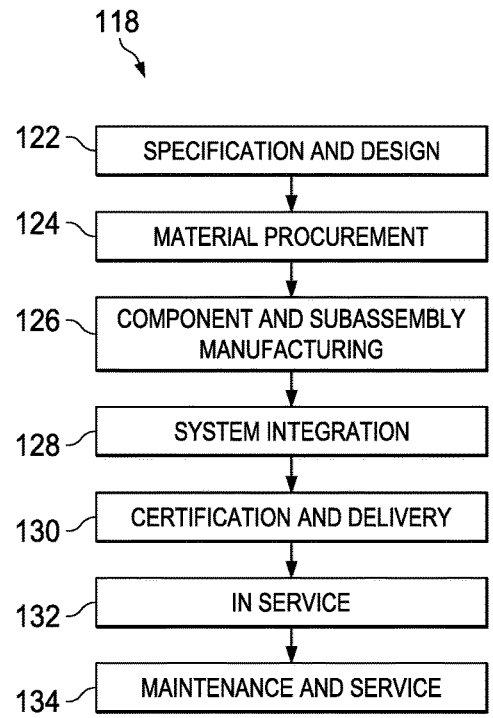
FIG. 18 is an illustration of a flow diagram of aircraft production and service methodology.
Figure 19:
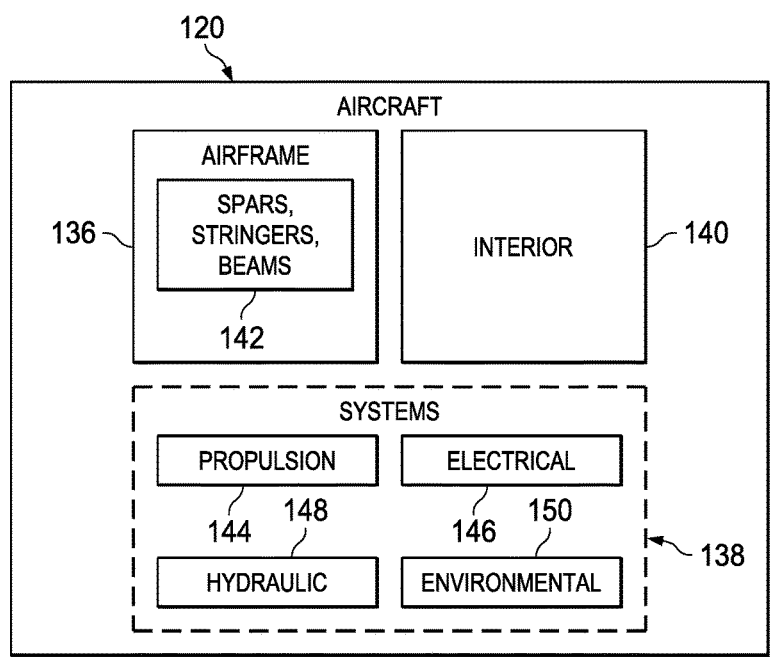
FIG. 19 is an illustration of a block diagram of an aircraft.

Embodiments of the disclosure may find use in a variety of potential applications, particularly in the transportation industry, including for example, aerospace, marine, automotive applications and other application where contoured composite laminate structural members may be used. Thus, referring now to FIGS. 18 and 19, embodiments of the disclosure may be used in the context of an aircraft manufacturing and service method 118 as shown in FIG. 18 and an aircraft 120 as shown in FIG. 19. Aircraft applications of the disclosed embodiments may include, for example, without limitation, spars, stringers, beams and similar structural members that are contoured along a major axis of loading. During pre-production, exemplary method 118 may include specification and design 122 of the aircraft 120 and material procurement 124. During production, component and sub-assembly manufacturing 126 and system integration 128 of the aircraft 120 takes place. Thereafter, the aircraft 120 may go through certification and delivery 130 in order to be placed in service 132. While in service by a customer, the aircraft 120 is scheduled for routine maintenance and service 134, which may also include modification, reconfiguration, refurbishment, and so on.

Each of the processes of method 118 may be performed or carried out by a system integrator, a third party, and/or an operator (e.g., a customer). For the purposes of this description, a system integrator may include without limitation any number of aircraft manufacturers and major system subcontractors; a third party may include without limitation any number of vendors, subcontractors, and suppliers; and an operator may be an airline, leasing company, military entity, service organization, and so on.

As shown in FIG. 19, the aircraft 120 produced by exemplary method 118 may include an airframe 136 with a plurality of systems 138 and an interior 1406. The airframe 136 may include spars, stringers, beams and similar structural members 142 having one or more contours. Examples of high-level systems 138 include one or more of a propulsion system 144 an electrical system 146 a hydraulic system 148 and an environmental system 150. Any number of other systems may be included. Although an aerospace example is shown, the principles of the disclosure may be applied to other industries, such as the marine and automotive industries.

Systems and methods embodied herein may be employed during any one or more of the stages of the production and service method 118. For example, components or subassemblies corresponding to production process 126 may be fabricated or manufactured in a manner similar to components or subassemblies produced while the aircraft 120 is in service. Also, one or more apparatus embodiments, method embodiments, or a combination thereof may be utilized during the production stages 126 and 128, for example, by substantially expediting assembly of or reducing the cost of an aircraft 120. Similarly, one or more of apparatus embodiments, method embodiments, or a combination thereof may be utilized while the aircraft 120 is in service, for example and without limitation, to maintenance and service 134.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of making a composite laminate part exhibiting reduced wrinkling, and having a desired contour along a major axis of loading:
    laying up a substantially flat stack of fiber plies each having a unidirectional fiber orientation, wherein the substantially flat stack of fiber plies is devoid of 0° plies, wherein at least some of the plies provide the part with primary axial stiffness along the major axis of loading, including orienting the plies providing the primary axial stiffness at off-angles relative to the major axis of loading;
    forming the stack to a desired cross sectional shape; and
    forming the stack to the desired contour along the major axis of loading, wherein during the forming, strain on the plies providing the primary axial stiffness is reduced by their off-angle orientation.

2. The method of claim 1, wherein the plies providing primary axial stiffness are oriented at off-angles within ranges of approximately +5° to +30°, and approximately −5° to −30°.

3. The method of claim 1, wherein laying up the flat stack includes orienting all of the plies in the stack at angles greater than approximately ±5° relative to the major axis of loading.

4. The method of claim 1, wherein orienting the plies is performed such that that fibers in the plies providing primary axial stiffness transition along their length during the forming of the desired contour from a compressive state to a neutral state, and from a neutral state to a tensile state.

5. The method of claim 1, further comprising:
    calculating thickness values for the plies;
    performing discrete ply thickness integer optimization;
    filtering the results of calculating thickness values for the plies and the discrete ply thickness integer optimization; and
    optimizing the shape and stacking sequence of the plies.

6. A method of making a contoured composite laminate part having a high aspect ratio, a major axis of loading and a plurality of zones along its length respectively having desired stiffnesses, comprising:
    selecting a set of fiber angles for plies of unidirectional reinforcing fibers, wherein the plies of unidirectional reinforcing fibers are devoid of 0° plies;
    determining, for each of the fiber angles, a number of plies in each of the zones required to provide a desired set of in-plane laminate properties in the zone;
    determining a shape and stacking sequence of the plies;
    laying up the plies into a flat stack using the stacking sequence; and
    forming the flat stack into the shape of the contoured composite laminate part.

7. The method of claim 6, wherein:
    determining the fiber angles includes selecting a plurality of possible combinations of fiber angles, and
    determining a number of plies in each of the zones required to provide a desired set of in-plane laminate properties in the zone is performed for each of the possible combinations of angles.

8. The method of claim 7, wherein:
    determining the fiber angles includes eliminating certain of the possible combinations of fiber angles using a set of composite laminate design rules.

9. The method of claim 6, wherein the set of fiber angles include fiber orientations relative to the major axis of loading of $\theta 1, \theta 2, \theta 3$, where $0<\theta 1<\theta 2 \le \theta 3 \le 90°$.

10. The method of claim 6, wherein:

$\theta 2 - \theta 1 \le 45°$, and $\theta 3 - \theta 2 \le 45°$.

11. The method of claim 9, wherein $\theta 1$ is selected to be between approximately 5° and 30°.

12. The method of claim 7, wherein:
    determining the number of plies in each of the zones includes limiting the number of plies to a discrete value by performing discrete ply thickness integer optimization.

13. The method of claim 12, wherein determining the number of plies in each of the zones includes filtering the results of the discrete ply thickness integer optimization based on an allowed deviation of effective laminate properties from the desired set of in-plane laminate properties.

14. A method of making a composite laminate stiffener having a major axis of loading, and contoured both longitudinally and transversely, comprising:
    laying up a substantially flat stack of fiber plies each having a unidirectional fiber orientation, wherein the substantially flat stack of fiber plies is devoid of 0° plies, wherein at least some of the plies provide the stiffener with primary axial stiffness along the major axis of loading, including orienting the plies providing the primary axial stiffness at off-angles relative to the major axis of loading;

forming the stack to desired transverse and longitudinal contours, wherein during the forming the fibers in plies providing the stiffener with primary axial stiffness transition along their lengths from a compression state, to a neutral state, and from the neutral state to a tensile state; and wherein during the forming, strain on the plies providing the primary axial stiffness is reduced by their off-angle orientation.

15. The method of claim 14, wherein the off-angle orientations of the plies providing the primary axial stiffness reduces the length to which the fibers of the plies are compressed and causes a portion of the compression is converted to shear deformation.

16. The method of claim 14, wherein the composite laminate stiffener is a stringer having a hat shape in cross-section, including a cap, a pair of webs and a pair of flanges, and wherein during forming:

the fibers in the plies at the cap are in the compression state, the fibers in the plies in the webs are in the neutral state, and the fibers in the flanges are in the tensile state.

17. The method of claim 14, wherein fibers in the plies providing the primary axial stiffness are shorter in length than the length of the composite laminate stiffener whereby transverse slip between the plies occurs during forming which reduces compression of the fibers.

18. The method of claim 14, wherein orienting the plies providing the primary axial stiffness at off-angles reduces the compression loading on the fibers in the plies during the forming.

19. The method of claim 14, wherein composite laminate stiffener is an existing stiffener design, and the method further comprises:

determining continuous ply thickness values for various ply angle combinations that match the stiffness and thickness of the existing stiffener design;

performing discrete ply thickness integer optimization, including calculating a number of plies with discrete ply thicknesses;

filtering the results of the ply thickness integer optimization, wherein a laminate design is selected that best reduces wrinkles during the forming; and generating layup information, including determining ply shapes and the stacking sequence conforming to a desired set of stacking sequence and manufacturability rules.

20. The method of claim 14, wherein the composite laminate stiffener includes a plurality of zones along its length respectively having differing stiffness requirements, and the method further comprises:

selecting orientations of the plies and a number of plies per orientation for each of the zones; and then, after selecting the orientations and the number of plies per orientation, selecting shapes of the plies in each of the zones.

21. A method of forming a composite laminate stiffener having a primary axis of loading, comprising:

laying up a flat composite laminate stack of plies of reinforcing fibers, wherein the flat composite laminate stack of plies of reinforcing fibers are devoid of 0° plies;

forming the composite laminate stack such that the fibers in at least some of the plies are subjected to compression loading; and shortening a length over which the fibers are compressed.

22. The method of claim 21, wherein the compression loading causes axial strain in the fibers, and the method further comprises:

reducing the axial strain in the fibers on those portions of the plies subjected to compression during forming.

23. The method of claim 21 wherein orienting the fibers is performed such that the reinforcing fibers transition from a compressive state to a neutral state, and from a neutral state to a tensile state.

24. The method of claim 21, further comprising:

orientating the fibers at angles relative to the primary axis of loading such that friction between plies is reduced which allows slippage between the plies.

25. The method of claim 24, wherein the angles of the fibers in the plies subjected to compression during forming are between approximately +5° and +30°, and between approximately −5° and −30°.

26. A method of forming a composite laminate stiffener contoured along a primary axis of loading, comprising:

laying up a flat stack of plies of reinforcing fibers, wherein the flat stack of plies of reinforcing fibers are devoid of 0° plies, some of the plies providing the stiffener with primary axial stiffness;

forming the flat stack to a desired contour along the primary axis of loading, wherein the forming places the fibers in the plies providing primary axial stiffness in compression and causes stretching of the fibers;

reducing the compression of the fibers in the plies providing primary axial stiffness by reducing a length over which the fibers are compressed during the forming; and converting a portion of the stretching into shear deformation.

27. The method of claim 26, wherein reducing the compression of the fibers includes orienting the plies providing primary axial stiffness at off-angles relative to the primary axis of loading.

28. The method of claim 26, wherein reducing the compression includes:

relaxing the fibers in the plies providing primary axial stiffness such that a portion of the length of the fibers transitions from a compression state to a neutral state and then to a tensile state.

29. The method of claim 28, wherein reducing the compression includes:

providing for transverse slip between the plies during the forming.

30. The method of claim 29, wherein reducing the compression includes:

reducing loading on the fibers during the forming to thereby reduce strain on the fibers in the plies providing primary axial stiffness.

31. The method of claim 14, wherein the plies providing primary axial stiffness are oriented at off-angles within ranges of approximately +5° to +30°, and approximately −5° to −30°.

32. The method of claim 14, wherein laying up the flat stack includes orienting all of the plies in the stack at angles greater than approximately ±5° relative to the major axis of loading.

33. The method of claim 26, wherein the plies providing primary axial stiffness are oriented at off-angles within ranges of approximately +5° to +30°, and approximately −5° to −30°.

34. The method of claim 26, wherein laying up the flat stack includes orienting all of the plies in the stack at angles greater than approximately ±5° relative to the major axis of loading.

35. The method of claim 26, further comprising:
calculating thickness values for the plies.

36. The method of claim 35, further comprising:
performing discrete ply thickness integer optimization.

37. The method of claim 36, further comprising:
filtering the results of calculating thickness values for the plies and the discrete ply thickness integer optimization; and
optimizing the shape and stacking sequence of the plies.

\* \* \* \* \*